(12) United States Patent
O'Brien, Jr. et al.

(10) Patent No.: US 6,430,522 B1
(45) Date of Patent: Aug. 6, 2002

(54) ENHANCED MODEL IDENTIFICATION IN SIGNAL PROCESSING USING ARBITRARY EXPONENTIAL FUNCTIONS

(75) Inventors: Francis J. O'Brien, Jr., Newport, RI (US); Chung T. Nguyen, Austin, TX (US); Bruce J. Bates, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/536,488

(22) Filed: Mar. 27, 2000

(51) Int. Cl.$^7$ .............................................. G06F 17/10
(52) U.S. Cl. ........................................ 702/181; 703/2
(58) Field of Search ................ 702/179–199; 703/2

(56) References Cited

U.S. PATENT DOCUMENTS

| | | | | |
|---|---|---|---|---|
| 5,339,826 A | * | 8/1994 | Schmidt et al. | 128/731 |
| 5,719,796 A | * | 2/1998 | Chen | 364/578 |
| 5,784,297 A | * | 7/1998 | O'Brien, Jr. et al. | 364/554 |
| 6,173,240 B1 | * | 1/2001 | Sepulveda et al. | 703/2 |
| 6,314,204 B1 | * | 11/2001 | Cham et al. | 382/228 |

\* cited by examiner

*Primary Examiner*—Marc S. Hoff
*Assistant Examiner*—Jeffrey R West
(74) *Attorney, Agent, or Firm*—Michael J. McGowan; Michael F. Oglo; Prithvi C. Lall

(57) ABSTRACT

A method for finding a probability density function (PDF) and its statistical moments for a chosen one of four newly derived probability models for an arbitrary exponential function of the forms $g(x) = \alpha x^m e^{-\beta x^n}$, $-\infty < x < \infty$;

$$g(x) = \alpha x^m e^{-\beta x^n}, \ 0 \le x < \infty;$$

$$g(x) = \alpha \left(\frac{x-a}{b}\right)^m e^{-\beta \left(\frac{x-a}{b}\right)^n}, \ -\infty < x < \infty; \text{ and}$$

$$g(x) = \alpha \left(\frac{x-a}{b}\right)^m e^{-\beta \left(\frac{x-a}{b}\right)^n}, \ 0 \le x < \infty.$$

The model chosen will depend on the domain of the data and whether information on the parameters a and b exists. These parameters may typically be the mean or average of the data and the standard deviation, respectively. Non-linear regression analyses are performed on the data distribution and a basis function is reconstructed from the estimates in the final solution set to obtain a PDF, a moment generating function and the mean and variance. Simple hypotheses about the behavior of such functional forms may be tested statistically once the empirical least squares methods have identified an applicable model derived from actual measurements.

16 Claims, 2 Drawing Sheets

ENHANCED MODEL IDENTIFICATION IN SIGNAL PROCESSING USING ARBITRARY EXPONENTIAL FUNCTIONS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

(1) Field of the Invention

This invention relates to a computer-aided method for signal or data processing and more particularly to a method for finding, by means of nonlinear regression analyses, a Probability Density Function (PDF) for arbitrary exponential functions falling into one of four classes, the underlying probability density function and data structures conforming to the exponential model.

(2) Description of the Prior Art

Of the many continuous probability distributions encountered in signal processing, a good number are distinguished by the fact that they are derived from exponential functions on the time interval of 0 to $\infty$, e.g., failure rate distributions, Poisson processes, Chi-Square, gamma, Rayleigh, Weibull, Maxwell and others involving exponential functions. Such an exponential function is also used in O'Brien et al. (U.S. Pat. No. 5,537,368) to generate a corrected data stream from the raw data stream of a sensor.

Occasionally modeling involves functions for which the probability density function (PDF) and its moments need to be derived de novo. Often times, research scientists and engineers are confronted with modeling a random variable x when the probability density function (PDF) is unknown. It may be known that the variable can be reasonably well approximated by a gamma density. Then solving a problem under the assumption that x has a gamma density will provide some insight into the true situation. This approach is all the more reasonable since many probability distributions are related to the gamma function. However, deriving the PDF and its statistical moments using the standard approach involving moment generating functions (MGF) and complex-variable characteristic functions is difficult and somewhat impractical to implement in applied research settings. The complexity of current methods for constructing the PDF and MGF limits the class of models used for analyzing correlated data structures. O'Brien et al. (U.S. Pat. No. 5,784,297) provided a method for finding a probability density function (PDF) and its statistical moments for an arbitrary exponential function of the form $g(x)=\alpha x^m e^{-\beta x^n}$, $0<x<\infty$, where $\alpha$, $\beta$, $n>0$, $m>-1$ are real constants in one-dimensional distributions and $g(x_1,x_2, \ldots ,x_1)$ in the hyperplane. However, the method in the '297 patent is based on a single probability model within the domain $0 \to \infty$, thus limiting its application.

SUMMARY OF THE INVENTION

Accordingly, it is a general purpose and object of the present invention to provide a computer-aided method for determining density and moment functions for a useful class of exponential functions in signal processing.

Another object of the present invention is to provide a method for constructing the PDF and MGF which offers the possibility of constructing the PDF and MGF for a larger class of such functions.

A still further object is to enhance standard assumptions about the structure of error or disturbance terms by including a larger class of models to choose from.

These objects are provided with the present invention by a simple substitution method for finding a probability density function (PDF) and its statistical moments for a chosen one of four newly derived probability models for an arbitrary exponential function of the forms $g(x)=\alpha x^m e^{-\beta x^n}$, $-\infty<x<\infty$;

$$g(x) = \alpha x^m e^{-\beta x^n}, \ 0 \le x < \infty;$$

$$g(x) = \alpha\left(\frac{x-a}{b}\right)^m e^{-\beta\left(\frac{x-a}{b}\right)^n}, \ -\infty < x < \infty; \ \text{and}$$

$$g(x) = \alpha\left(\frac{x-a}{b}\right)^m e^{-\beta\left(\frac{x-a}{b}\right)^n}, \ 0 \le x < \infty.$$

The model chosen will depend on the domain of the data and whether information on the parameters a and b exists. These parameters may typically be the mean or average of the data and the standard deviation, respectively. For example, it may be known that the signal of interest within the data being processed has a domain from $-\infty \to \infty$ and a typical mean and standard deviation. Thus a model of the third form would be used.

Once the model is chosen, computer implemented nonlinear regression analyses are performed on the data distribution to determine the solution set $S_n(\alpha_n, m_n, \beta_n, n)$ beginning with n=1. A root-mean-square (RMS) is calculated and recorded for each order of n until the regression analyses produce associated RMS values that are not changing in value appreciably. The basis function is reconstructed from the estimates in the final solution set and a PDF for the basis function is obtained utilizing methods well known in the art. The MGF, which characterizes any statistical moment of the distribution, is obtained using a novel function derived by the inventors and the mean and variance are obtained in standard fashion. Once the parameters $\alpha$, $\beta$, m and n have been determined for a set of data measurements through the system identification modeling, the PDF-based mean and variance are determinable, and simple binary hypotheses may be tested.

By the inclusion of four newly derived models, the method of the present invention provides a choice of models from a larger and more useful class of exponential functions covering the full domain $(-\infty \to \infty)$. The method of the present invention further provides enhanced standard assumptions about the structure of error or disturbance terms by the use of additional variables such as mean and standard deviation parameters.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
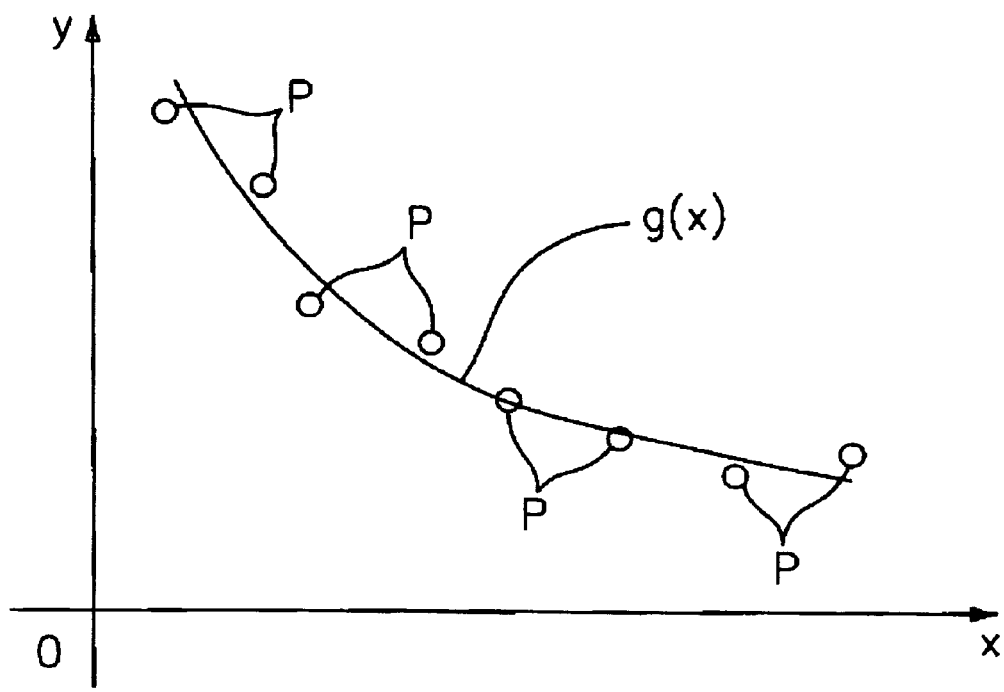
FIG. 1 shows a set of data points appearing to conform to a negative exponential (or decay) function.
Figure 2:
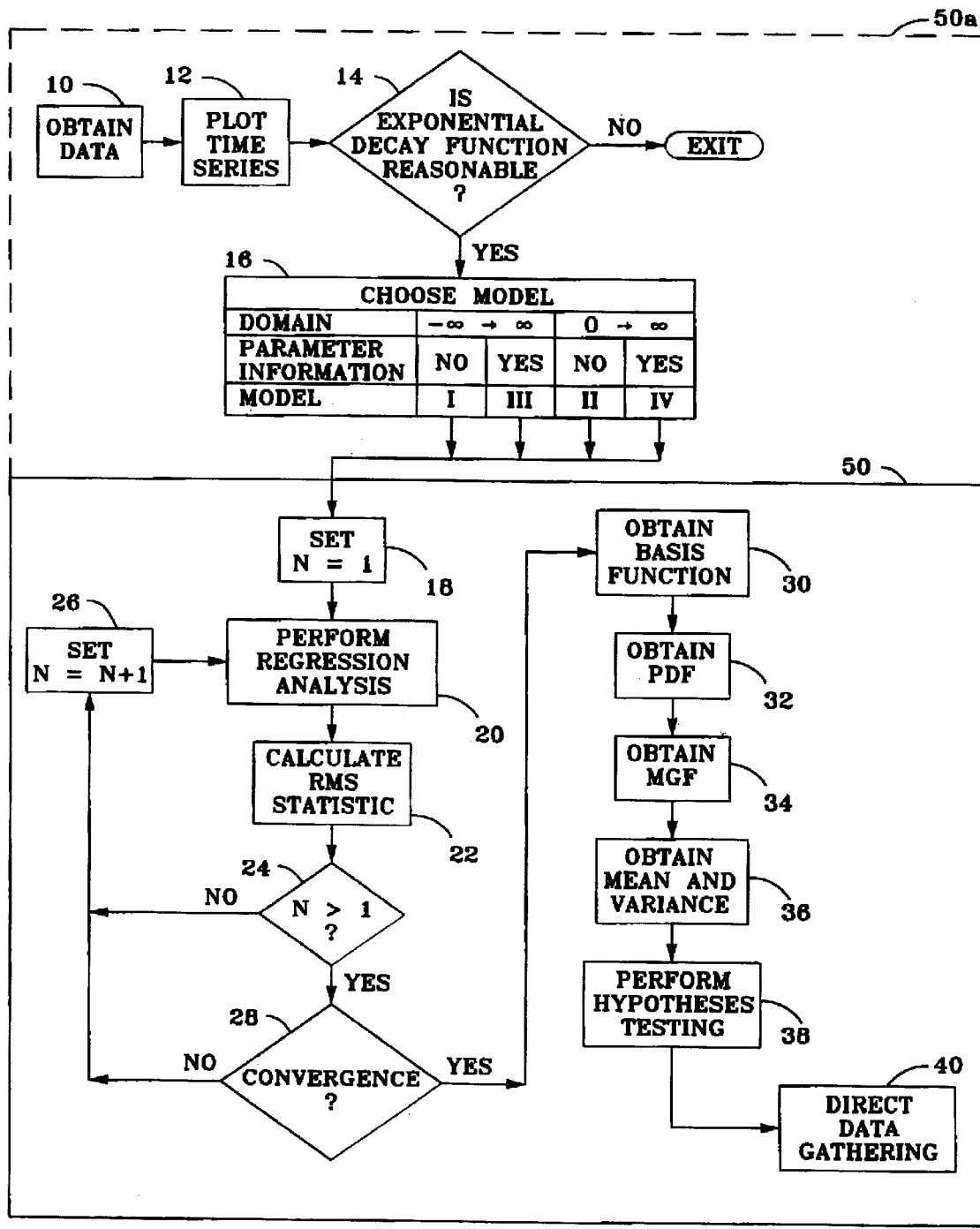
FIG. 2 is a flow chart of the steps used to identify and characterize the function of FIG. 1.

Referring to FIG. 1, there is shown a plot of a measured time series. Each point "p" corresponds to a measurement taken by a sensor at a certain time. Such a plot may correspond to the output signals from a sonar sensor. In order to analyze the signals, it is necessary to identify a frequency function, g(x), which models or characterizes the data structure. Referring now also to FIG. 2, there is shown a flow chart of the steps used to obtain g(x). The data are first obtained in step 10 and then the measured time series is plotted at step 12, as has been done in FIG. 1 to determine, at step 14, if an exponential decay function is reasonable. It can be seen from FIG. 1 that as time increases, the measured value decreases. Such a decreasing function over time may correspond to a negative exponential (or decay) function. Since the data points of FIG. 1 appear to correspond to an exponential decay function, step 14 transfers control to step 16. If an exponential decay function was not reasonable, step 14 would exit from the method and a different model approach would be required to analyze the data.

Step 16 chooses a model to characterize the data, depending on the domain of the data and whether certain parameter information, such as mean and standard deviation, is known about the data. As can be seen from the grid in step 16, Model I and Model III are applicable where the domain is $-\infty \to \infty$; Model II and Model IV are applicable for domains of $0 \to \infty$; Model I and Model II are applicable when no parameter information is available; and Models III and Model IV are applicable when parameter information is available.

For FIG. 1, g(x) is shown as a sloping-down arc and is assumed to be an optimum least-squares solution derived for the discrete time series data points "p". It is noted that the domain for the data is $0 \to \infty$. In addition, for the example of FIG. 1, it will be assumed that no parameter information is available, thus Model II is appropriate. Let the function g(x) for Model II be denoted by $$g(x) = \alpha x^m e^{-\beta x^n}, \ 0 < x < \infty \tag{1}$$

where $\alpha$, $\beta$, n>0, m>−1 are real constants. The function g(x) is obtained in the standard manner for exponential functions. First take the natural logarithm of the modeling basis, or exponential function of Equation (1):

$$\log[g(x)] = \log \alpha + m \log x - \beta x^n. \tag{2}$$

Because the term $\beta x^n$ in nonlinearizable, a nonlinear approach must be taken. This approach consists of performing regression analysis on g(x), with the nonlinear parameter n set to a specific integer value n=1, 2, 3, etc. Each [x,y] observation in the sample is indexed with the subscript i, where i runs from 1 to p, p being the total number of data points. Nonlinear regression analyses are performed on the data distribution based on the least squares minimization criterion, stated as follows:

$$S_n(\alpha, m, \beta, n) = \sum_{i=1}^{p} ([\log y_i - \log \alpha - m \log x_i + \beta x_i^n])^2 \to \min \tag{3}$$

where $\alpha$, $\beta$, m and n are real-valued constants that we seek to identify through classical least squares regression analyses. Step 18 begins the regression analyses by first setting n=1.

In step 20 the regression is performed using the ordinary least squares (OLS) algorithm, well known to those skilled in the art, beginning with the parameter n=1 from step 18. The result is the first solution set, $S_1(\alpha_1, m_1, \beta_1, 1)$, with parameters $\alpha$, $\beta$ and m estimated. The solution set is recorded and stored. In step 22 a measure of the adequacy of solution set $S_1(\alpha_1, m_1, \beta_1, 1)$ is obtained and, in standard engineering fashion, the root-mean-square (RMS) statistic is calculated and recorded. Since n=1, step 24 passes control to step 26 which increments parameter n and returns to steps 20 and 22. With n now having a value of 2, step 20 calculates a new solution set $S_2(\alpha_2, m_2, \beta_2, 2)$, and step 22 calculates a new RMS statistic. Since n is now greater than 1, step 24 passes control to step 28 which tests for convergence of the associated RMS statistics. If the associated RMS values are changing in value more than a chosen convergence threshold, step 26 is repeated so as to increment n and steps 20 through 28 are repeated until at some value n=k, the associated RMS values are not changing in value by more than the chosen convergence threshold. The solution set $S_k(\alpha_k, m_k, \beta_k, k)$ is then called the "optimum" solution. Step 30 obtains the basis function which is the exponential function reconstructed from the estimates in the final solution set $S_k(\alpha_k, m_k, \beta_k, k)$. The basis function will be identified as follows:

$$g(x) = \alpha x^m e^{-\beta x^k}, \tag{4}$$

obtained from the parameter estimate set $S_k(\alpha_k, m_k, \beta_k, k)$, the empirical least squares solution to the data generated in the time series. In step 32, the probability density function (PDF), a concept well known to those in the art, is obtained from the basis function. The moment generating function (MGF) is then obtained in step 34 and the mean and variance are obtained from the MGF in step 36.

The mathematics involved in obtaining the PDF and MGF are quite complex. The method of the present invention utilizes two, independently derived improper definite integrals based on the general exponential integral formula in F. J. O'Brien, S. E. Hammel and C. T. Nguyen, "The Moi Formula for Improper Exponential Definite Integrals," *Perceptual and Motor Skills*, 79, 1994, pp. 1123–1127, and presented in F. J. O'Brien, S. E. Hammel and C. T. Nguyen, "The Moi Formula," accepted in I. S. Gradshteyn and I. M. Ryzhik, Table of Integrals, Series and Products, Academic Press (New York 1994). These two new integrals take the forms:

$$\int_{-\infty}^{\infty} \alpha x^m e^{-\beta x^n} dx = \tag{5}$$

$$\begin{cases} 2 \dfrac{\alpha \Gamma(y)}{n \beta^y}, \text{ for even function on } -\infty < x < \infty \\ \text{where } y = \dfrac{m+1}{n} > 0, m \geq 0, \alpha, \beta, n > 0 \\ 0, \text{ odd function} \end{cases} ; \text{ and}$$

$$\int_0^{\infty} \alpha x^m e^{-\beta x^n} dx = \dfrac{\alpha \Gamma(y)}{n \beta^y} \text{ for } 0 \leq x < \infty \text{ where } y = \dfrac{m+1}{n} > 0, \tag{6}$$

$$m > -1, \alpha, \beta, n > 0,$$

where $\Gamma(y)$ represents the standard gamma function in Equations (5) and (6). It will be appreciated that many real-valued one-dimensional and, by extension, multidimensional exponential functions conform to those two integrals above including functions (comprising the integrands) which must first be manipulated algebraically and/or analytically by means of change of variable, substitution, binomial expansion, completing the square or first-order differential equation analysis manipulation, inter alia. The first model, Model I, involves the integral of (5) and takes the form:

$$\int_{-\infty}^{\infty} ax^m e^{-\beta x^n} dx, \; -\infty < x < \infty. \tag{7}$$

The second model, Model II, is based on Equation (6):

$$\int_{0}^{\infty} ax^m e^{-\beta x^n} dx \; 0 \leq x < \infty. \tag{8}$$

The general integral of Model III is based on Equation (5):

$$\int_{-\infty}^{\infty} a\left(\frac{x-a}{b}\right)^m e^{-\beta\left(\frac{x-a}{b}\right)^n} dx, \; -\infty < x < \infty. \tag{9}$$

The last model, Model IV, arises less often than others, but it is a valid expression of probability models to be considered. The integral of interest is, based on (2):

$$\int_{0}^{\infty} a\left(\frac{x-a}{b}\right)^m e^{-\beta\left(\frac{x-a}{b}\right)^n} dx, \; 0 \leq x < \infty. \tag{10}$$

In both Equations (9) and (10), a and b are some constants selected by the practitioner and represent parameters of the data for which the user of the method has some knowledge. As previously noted, these parameters may typically be the mean and standard deviation of the data. Solving Equations (9) and (10) involves a change of variable such that $$s = \frac{x-a}{b}$$

and $ds/dx = b^{-1}$. Then it can readily be seen that Equation (9) falls under Equation (5) and Equation (10) falls under Equation (6).

Use of the Equations (7) through (10) will simplify the mathematics involved in deriving PDF's and moments for a useful class of continuous functions. Table 1 lists twelve frequently encountered continuous probability density functions (PDF's) taken from standard sources such as P. J. Hoel, et al., *Introduction to Probability Theory,* Houghton-Mifflin (Boston, 1971) and Abramowitz, M., Stegun, I. A., chapter 26, *Handbook of Mathematical Functions,* Washington, D.C. (Government Printing Office 1964). Each of those densities can be classified into one of the four probability models above and expressed in terms of the seven parameters, a, b, α, m, n, β and γ of the above four classes of exponential functions. Each of the densities in Table 1 is distinguished by the fact that when integrated over its appropriate interval, 0 (or −∞) to ∞, each is equal to 1, the definition of a PDF.

TABLE 1

Selected Univariate Densities Based on Exponential Functions

| Density Name | Domain | Probability density function, f(x) | Parameter Restriction |
|---|---|---|---|
| Exponential | $0 \leq x < \infty$ | $\lambda e^{-\lambda x}$ | $0 < \lambda < \infty$ |
| Gamma | $0 \leq x < \infty$ | $\frac{\lambda^p}{\Gamma(p)} x^{p-1} e^{-\lambda x}$ | $0 < p < \infty$<br>$0 < \lambda < \infty$ |

TABLE 1-continued

Selected Univariate Densities Based on Exponential Functions

| Density Name | Domain | Probability density function, f(x) | Parameter Restriction |
|---|---|---|---|
| Chi-Square | $0 \leq x < \infty$ | $\frac{x^{\frac{v}{2}-1}}{\Gamma(\frac{v}{2})2^{\frac{v}{2}}} e^{-\frac{x}{2}}$ | $0 < n < \infty$ |
| Rayleigh | $0 \leq x < \infty$ | $2axe^{-ax^2}$ | $0 < a < \infty$ |
| Gamma-Poisson | $0 \leq x < \infty$ | $\frac{(d(c\lambda))^m}{\Gamma(m)} x^{md-1} e^{-c\lambda x^d}$ | $0 < m < \infty$<br>$0 < \lambda < \infty$<br>$0 < c < \infty$<br>$2 \leq d < \infty$ |
| Weibull | $0 \leq x < \infty$ | $abx^{b-1} e^{-ax^b}$ | $0 < a < \infty$<br>$0 < b < \infty$ |
| Maxwell | $0 \leq x < \infty$ | $\sqrt{2/\pi} \, x^2 e^{-\frac{1}{2}x^2}$ | none |
| Error Function | $-\infty < x < \infty$ | $\frac{h}{\sqrt{\pi}} e^{-h^2 x^2}$ | $0 < h < \infty$ |
| Normal (Standardized) | $-\infty < x < \infty$ | $\frac{1}{\sqrt{2\pi}} e^{-\frac{1}{2}x^2}$ | none |
| Normal (Non Standardized) | $-\infty < x < \infty$ | $\frac{1}{\sigma\sqrt{2\pi}} e^{-\frac{1}{2}\left(\frac{x-\mu}{\sigma}\right)^2}$ | $-\infty < \mu < \infty$<br>$0 < \sigma < \infty$ |
| Laplace | $-\infty < x < \infty$ | $\frac{1}{2b} e^{-\left|\frac{x-a}{b}\right|}$ | $-\infty < a < \infty$<br>$0 < b < \infty$ |
| Pearson (Type III) | $a \leq x < \infty$ | $\frac{1}{b\Gamma(p)} \left(\frac{x-a}{b}\right)^{p-1} e^{-\left(\frac{x-a}{b}\right)}$ | $-\infty < a < \infty$<br>$0 < b < \infty$<br>$0 < p < \infty$ |

Equations (5) and (6) are used in step 32 to find a one-dimensional probability density function (PDF) for one of the four classes (Models I through IV) of exponential functions chosen at step 16. Abramowitz provides a summary of the mathematical properties comprising a PDF. For the purposes of this method, a PDF f(x) is assumed to be a real-valued non negative function. A PDF for Model I and Model III will also be an even function. In Equation (5), m and n are even numbers or fractions with even numerators. Continuing with the example of Model II used previously, then for any function corresponding to Equation (1), the PDF f(x) is given by standard integral calculus techniques applied to bounded, improper exponential definite integrals:

$$f(x) = \frac{n\beta}{\Gamma(\gamma)} x^m e^{-\beta x^n} \tag{11}$$

$$f(x) \geq 0$$

$$\int_{0}^{\infty} f(x) dx = 1,$$

where f(x) will denote the PDF of an arbitrary distribution. Using similar reasoning, it can be demonstrated that for the other three probability models, the corresponding PDF's are as given in Table 2.

TABLE 2

Density Functions

| Model | Domain | Integral Equation | Normalizing Constant c | PDF f(x) |
|---|---|---|---|---|
| I | $-\infty < x < \infty$ | $\int_{-\infty}^{\infty} \alpha x^m e^{-(\beta x)^n} dx$ | $\dfrac{n\beta^\gamma}{2\alpha\Gamma(\gamma)}$ | $\dfrac{n\beta^\gamma}{2\Gamma(\gamma)} x^m e^{-\beta x^n}$ |
| II | $0 \leq x < \infty$ | $\int_0^{\infty} \alpha x^m e^{-(\beta x)^n} dx$ | $\dfrac{n\beta^\gamma}{\alpha\Gamma(\gamma)}$ | $\dfrac{n\beta^\gamma}{\Gamma(\gamma)} x^m e^{-(\beta x)^n}$ |
| III | $-\infty < x < \infty$ | $\int_{-\infty}^{\infty} \alpha \left(\dfrac{x-a}{b}\right)^m e^{-\beta\left(\frac{x-a}{b}\right)^n} dx$ | $\dfrac{n\beta^\gamma}{2\alpha b\Gamma(\gamma)}$ | $\dfrac{n\beta^\gamma}{2b\Gamma(\gamma)}\left(\dfrac{x-a}{b}\right)^m e^{-\beta\left(\frac{x-a}{b}\right)^n}$ |
| IV | $0 \leq x < \infty$ | $\int_0^{\infty} \alpha \left(\dfrac{x-a}{b}\right)^m e^{-\beta\left(\frac{x-a}{b}\right)^n} dx$ | $\dfrac{n\beta^\gamma}{\alpha b\Gamma(\gamma)}$ | $\dfrac{n\beta^\gamma}{b\Gamma(\gamma)}\left(\dfrac{x-a}{b}\right)^m e^{-\beta\left(\frac{x-a}{b}\right)^n}$ |

The following parameter restrictions apply to the models:

Model I (even function PDF)
$\gamma = \dfrac{m+1}{n} > 0$
$m \geq 0, n, \alpha, \beta > 0$ Model II
$\gamma = \dfrac{m+1}{n} > 0$
$m > -1$
$\alpha, \beta, n > 0$ Model III (even function PDF)
$\gamma = \dfrac{m+1}{n} > 0$
$m \geq 0, n, \alpha, \beta, b > 0$
$-\infty > a > \infty$ Model IV
$\gamma = \dfrac{m+1}{n} > 0$
$m > -1$
$\alpha, \beta, n, b > 0$
$-\infty > a > 28$ Once the PDF is obtained, the moment generating function (MGF), which characterizes any statistical moment of the distribution, is obtained in step 34. The moments of a probability density function are important for several reasons. The first moment corresponds to the mean of the distribution, and the second moment allows a calculation of the dispersion or variance of the distribution as indicated in step 36. The mean and variance may then be used in the central limit theorem or normal approximation formula for purposes of hypothesis testing. Additional moment-based relations such as skewness and kurtosis coefficients can also be calculated.

The moment generating functions (MGF) for the four models are shown in Tables 3a (moments about the origin) and 3b (moments about the mean:

TABLE 3a

Moments About Origin Function

| Model | Moments Function, $EX^i$ | Notes |
|---|---|---|
| I | $\dfrac{\beta^{-j/n}\Gamma(\gamma + j/n)}{\Gamma(\gamma)}$ | $EX^j = 0$, j odd $(j \geq 1)$ |

TABLE 3a-continued

Moments About Origin Function

| Model | Moments Function, $EX^i$ | Notes |
|---|---|---|
| II | $\dfrac{\beta^{-j/n}\Gamma(\gamma + j/n)}{\Gamma(\gamma)}$ | |
| III | $\dfrac{j!}{\Gamma(\gamma)} \sum_{k=0}^{2k=j} \dfrac{a^{j-2k} b^{2k} \beta^{-2k/n} \Gamma\left(\gamma + \dfrac{2k}{n}\right)}{(2k)!(j-2k)!}$ | $EX^j = 0$, j odd $(j \geq 3)$ |
| IV | $\dfrac{j!}{\Gamma(\gamma)} \sum_{k=0}^{j} \dfrac{a^{j-k} b^k \beta^{-k/n} \Gamma\left(\gamma + \dfrac{k}{n}\right)}{(k)!(j-k)!}$ | |

TABLE 3b

Moments About Mean Functions

| Model | Moments Function, $E(X - \mu)^i$ | Notes |
|---|---|---|
| I | $\dfrac{\beta^{-j/n}\Gamma(\gamma + j/n)}{\Gamma(\gamma)}$ | $E(X - \mu)^j = 0$, j odd |
| II | $\dfrac{j!\beta^{-j/n}}{\Gamma(\gamma)} \sum_{k=0}^{i} (-1)^{j-k} \dfrac{\left[\dfrac{\Gamma\left(\gamma + \dfrac{1}{n}\right)}{\Gamma(\gamma)}\right]^{j-k} \Gamma\left(\gamma + \dfrac{k}{n}\right)}{(k)!(j-k)!}$ | |
| III | $\dfrac{b^j \beta^{-j/n}\Gamma(\gamma + j/n)}{\Gamma(\gamma)}$ | $E(X - \mu)^j = 0$, j odd $(j \geq 3)$ |
| IV | $\dfrac{j!b^j\beta^{-j/n}}{\Gamma(\gamma)} \sum_{k=0}^{i} (-1)^{j-k} \dfrac{\left[\dfrac{\Gamma\left(\gamma + \dfrac{1}{n}\right)}{\Gamma(\gamma)}\right]^{j-k} \Gamma\left(\gamma + \dfrac{k}{n}\right)}{(k)!(j-k)!}$ | |

The mean and the variance are obtained in step 36 in standard fashion well known in the art. The mean is defined as $\mu=E(x)$, and the variance is defined as $\sigma^2=E(x^2)-\mu^2$. The mean and variance for the four models are shown in Table 4:

TABLE 4

Means and Variances

| Model | Mean, $\mu$ | Variance, $\sigma^2$ |
|---|---|---|
| I | 0 | $\beta^{-2/n}\dfrac{\Gamma\left(\gamma+\dfrac{2}{n}\right)}{\Gamma(\gamma)}$ |
| II | $\dfrac{\beta^{-1/n}\Gamma(\gamma+1/n)}{\Gamma(\gamma)}$ | $\beta^{-2/n}\left\{\dfrac{\Gamma\left(\gamma+\dfrac{2}{n}\right)}{\Gamma(\gamma)}-\left[\dfrac{\Gamma\left(\gamma+\dfrac{1}{n}\right)}{\Gamma(\gamma)}\right]^2\right\}$ |
| III | $a$ | $b^2\beta^{-2/n}\dfrac{\Gamma\left(\gamma+\dfrac{2}{n}\right)}{\Gamma(\gamma)}$ |
| IV | $a+b\beta^{-1/n}\dfrac{\Gamma(\gamma+1/n)}{\Gamma(\gamma)}$ | $b^2\beta^{-2/n}\left\{\dfrac{\Gamma\left(\gamma+\dfrac{2}{n}\right)}{\Gamma(\gamma)}-\left[\dfrac{\Gamma\left(\gamma+\dfrac{1}{n}\right)}{\Gamma(\gamma)}\right]^2\right\}$ |

The mean and variance may then be used in the central limit theorem or normal approximation formula for purposes of hypothesis testing in step 38, the primary use of the method being to test statistically hypotheses about the behavior of such functional forms once the empirical least squares methods have identified an applicable model derived from actual measurements. The central limit theorem or normal approximation formulas are typically of interest to those skilled in the art for evaluation of simple hypotheses. *Chebychev's Theorem,* which gives the probability of deviation from a mean regardless of the distribution, may also be of interest. The results of the hypotheses testing of step 38 can then be used to direct additional data gathering at step 40.

Confirmatory calculations, based on the entire method for the known probability distributions of Table 1, substantiate the correctness of the model calculations in that they agree with well known published results from statistical literature. In addition, the densities of Table 1 can be classified into the four models as follows:

Model I—Error Function and Normal (Standardized);
Model II—Exponential, Gamma, Chi-Square, Rayleigh, Gamma-Poisson, Weibull and Maxwell;
Model III—Normal (non-Standardized) and Laplace; and
Model IV—Pearson (Type III).

It can be seen from the iterative nature of the OLS algorithm being used that the method is suitable for implementation on computer 50, shown encompassing steps 18 through 40. Depending on the nature of the sensors being used to generate the data and on the nature of the data itself, the functions of computer 50 may include obtaining the data at step 10 through choosing a model at step 16, as shown by enlarged computer portion 50*a*. Alternately, steps 10 through 16 may be performed by a user and the results input into computer 50 to perform the regression analysis.

It is to be noted that the form of Equation (3) and the basis function, Equation (4) vary corresponding to the model chosen at step 16. Equation (3) is used for Model I and II, the limits being $-\infty<(x_i,y_i)<\infty$ for Model I and $0\leq(x_i,y_i)<\infty$ for Model II. For Models III and IV, a substitution is made into Equation (3) yield:

$$S_n(\alpha, m, \beta, n) = \sum_{i=1}^{p}\left[\log y_i - \log\alpha - m\log\left(\frac{x_i-a}{b}\right)+\beta\left(\frac{x_i-a}{b}\right)^n\right]^2 \to \min, \quad (12)$$

Models III and IV having limits corresponding to Models I and II, respectively. The basis functions for Model I are the same as Equation (4) with limits as shown above. As with Equation (3), the basis function for Models III and IV is also obtained by substitution and having the same limits as above:

$$g(x) = \alpha\left(\frac{x-a}{b}\right)^m e^{-\beta\left(\frac{x-a}{b}\right)^n}. \quad (4)$$

What has thus been described is a method which offers a general solution for determining density and moment functions for a useful class of exponential functions in signal processing. The present method offers the possibility of constructing the PDF and MGF for a much larger class of such functions than the standard distributions, such as those listed in Table 1. Moreover, standard assumptions about the structure of error or disturbance terms can be enhanced by including a larger class of models to choose from. Many alternative or additional approaches can be introduced into the method disclosed. For example, the regression analyses can be performed with the key parameter n set to noninteger values. Also, measures other than the standard RMS statistic, such as the normalized "squared statistical correlation coefficient", can be used to judge the degree of fit to the distribution. Further, many real-valued, one-dimensional and, by extension, multidimensional exponential functions conform to the two integrals Equations (5) and (6) but which must first be manipulated algebraically and/or analytically by means of change of variable, substitution, binomial expansion, completing the square or first-order differential equation analysis manipulation, inter alia, prior to classification of the function into one of the four models for use in the method of the present invention.

In light of the above, it is therefore understood that within the scope of the appended claims, the invention may be practiced otherwise than as specifically described.

What is claimed is:

1. A method for identifying and characterizing an error structure model in processing signal data generated by a sensor comprising:
   obtaining the signal data;
   choosing the model from a plurality of models based on a domain and parameter information available for the signal data;
   storing the signal data as the model within a computer;
   obtaining a basis function for the model;
   determining a probability density function of the basis function;
   determining a statistical moment of the basis function;
   obtaining a mean and a variance for the model from the statistical moment;
   using the mean and the variance to perform hypotheses testing of the model; and
   using the results of the testing to direct further signal data generation by the sensor.

2. The method of claim 1 wherein choosing the model further comprises:
   plotting the signal as a series of data points; and
   determining if the data points correspond to an exponential decay function.

3. The method of claim 2 wherein choosing the model further comprises:
   choosing a model in the form $$\int_k^\infty \alpha x^m e^{-\beta x^n} dx$$

when no parameter information is known; and
   choosing a model in the form $$\int_k^\infty \alpha \left(\frac{x-a}{b}\right)^m e^{-(\beta(\frac{x-a}{b}))^n} dx$$

when parameter information is known, where a and b denote the known parameters and k denotes a lower bound of the domain of the signal data.

4. The method of claim 3 wherein choosing the model further comprises constraining limits of the model to the domain of the signal data to identify a first model of the form $$\int_{-\infty}^\infty \alpha x^m e^{-\beta x^n} dx$$

having the domain $-\infty < x < \infty$, a second model of the form $$\int_0^\infty \alpha x^m e^{-\beta x^n} dx$$

having the domain $0 \le x < \infty$, a third model of the form $$\int_{-\infty}^\infty \left(\alpha\left(\frac{x-a}{b}\right)\right)^m e^{-(\beta(\frac{x-a}{b}))^n} dx$$

having the domain $-\infty < x < \infty$ and a fourth model of the form $$\int_0^\infty \left(\alpha\left(\frac{x-a}{b}\right)\right)^m e^{-(\beta(\frac{x-a}{b}))^n} dx$$

having the domain $0 \le x < \infty$.

5. The method of claim 4 wherein obtaining the basis function for the model further comprises:
   denoting the basis function as an exponential function having the form $g(x)=\alpha x^m e^{-\beta x^n}$, $-\infty < x < \infty$ for the first model, the form $g(x)=\alpha x^m e^{-\beta x^n}$, $0 < x < \infty$ for the second model, the form $$g(x) = \left(\alpha\left(\frac{x-a}{b}\right)\right)^m e^{-(\beta(\frac{x-a}{b}))^n}, -\infty < x < \infty$$

for the third model and the form $$g(x) = \left(\alpha\left(\frac{x-a}{b}\right)\right)^m e^{-(\beta(\frac{x-a}{b}))^n},$$

$0 \le x < \infty$ for the fourth model; and
   performing a regression analysis on said exponential function to determine final values of the parameters $\alpha$, $\beta$, m and n of the exponential function.

6. The method of claim 5 wherein performing the regression analysis further comprises:
   iteratively setting trial values for the parameter n;
   obtaining a solution set for the parameters $\alpha$, $\beta$ and m for each iterative trial value of n;
   obtaining a statistical measure of the adequacy of the solution set;
   comparing successive statistical adequacy measures to determine if changes in the adequacy measures are within a convergence threshold; and
   using a last iterative value of n and corresponding solution set values of $\alpha$, $\beta$ and m as the final values when the change in the statistical adequacy measures are within the convergence threshold.

7. The method of claim 6 wherein obtaining the solution set further comprises performing a least squares regression analysis.

8. The method of claim 6 wherein the statistical adequacy measure is a root-mean-square statistic.

9. The method of claim 6 wherein the statistical adequacy measure is a normalized squared statistical correlation coefficient.

10. The method of claim 3 wherein the parameters a and b represent a known mean and standard deviation, respectively, of a class of data to which the signal data belong.

11. The method of claim 5 wherein determining the probability density function further comprises:
    denoting the probability density function as $$f(x) = \frac{n\beta^\gamma}{2\Gamma(\gamma)} x^m e^{-\beta x^n}$$

for the first model, as $$f(x) = \frac{n\beta^\gamma}{\Gamma(\gamma)} x^m e^{-\beta x^n}$$

for the second model, as $$\frac{n\beta^\gamma}{2b\Gamma(\gamma)} \left(\frac{x-a}{b}\right)^m e^{-\beta(\frac{x-a}{b})^n}$$

for the third model and as $$\frac{n\beta^\gamma}{b\Gamma(\gamma)} \left(\frac{x-a}{b}\right)^m e^{-\beta(\frac{x-a}{b})^n}$$

for the fourth model, where $\gamma =$ $$\frac{m+1}{n}$$

and $\Gamma(\gamma)$ is a standard gamma function; and
    solving for the probability density function by substituting in the equation for f(x), the final values of the parameters $\alpha$, $\beta$, m and n.

12. The method of claim 5 wherein the statistical moment is determined from the final values of the parameters $\alpha$, $\beta$, m and n using the relationship $$E(x^j) = \beta^{-j/n} \frac{\Gamma\left(\gamma + \frac{j}{n}\right)}{\Gamma(\gamma)} = 0, \ j(\text{odd}, j \geq 1),$$

for the first model, the relationship $$E(x^j) = \beta^{-j/n} \frac{\Gamma\left(\gamma + \frac{j}{n}\right)}{\Gamma(\gamma)}$$

for the second model, the relationship $$E(x^j) = \frac{j!}{\Gamma(\gamma)} \sum_{k=0}^{2k=j} \frac{a^{j-2k} b^{2k} \beta^{-2k/n} \Gamma\left(\gamma + \frac{2k}{n}\right)}{2k!(j-2k)!} = 0, \ j(\text{odd}, j \geq 3)$$

for the third model and the relationship $$E(x^j) = \frac{j!}{\Gamma(\gamma)} \sum_{k=0}^{j} \frac{a^{j-k} b^{k} \beta^{-k/n} \Gamma\left(\gamma + \frac{k}{n}\right)}{k!(j-k)!}$$

for the fourth model, where $$\gamma = \frac{m+1}{n}$$

and $\Gamma(\gamma)$ is a standard gamma function.

13. The method of claim 12 wherein:
the mean is determined from the relationship $\mu = E(x)$; and
the variance is determined from the relationship $$\theta^2 = E(x^2) - \mu^2.$$

14. The method of claim 1 wherein the parameter information represents known mean and standard deviation parameters of a class of data to which the signal data belong.

15. A method for identifying and characterizing an error structure model in processing signal data generated by a sensor comprising:
obtaining and storing the signal data within a computer;
choosing the model from a plurality of models based on a domain and parameter information available for the signal data;
obtaining a basis function for the model, the basis function being in the form of $g(x) = \alpha x^m e^{-\beta x^n}$ when no parameter information is known and in the form $$g(x) = a\left(\frac{x-a}{b}\right)^m e^{-\beta\left(\frac{x-a}{b}\right)^n}$$

when parameter information is known, where a and b denote the known parameters, a domain of the basis function corresponding to the domain of the signal data;

determining a statistical moment of the basis function using the relationship $$E(x^j) = \beta^{-j/n} \frac{\Gamma\left(\gamma + \frac{j}{n}\right)}{\Gamma(\gamma)} = 0, \ j(\text{odd}, j \geq 1)$$

when no parameter information is known and a lower bound of the domain of the signal data is $-\infty$, the relationship $$E(x^j) = \beta^{-j/n} \frac{\Gamma\left(\gamma + \frac{j}{n}\right)}{\Gamma(\gamma)}$$

when no parameter information is known and the lower bound is 0, the relationship $$E(x^j) = \frac{j!}{\Gamma(\gamma)} \sum_{k=0}^{2k=j} \frac{a^{j-2k} b^{2k} \beta^{-2k/n} \Gamma\left(\gamma + \frac{2k}{n}\right)}{2k!(j-2k)!} = 0, \ j(\text{odd}, j \geq 3)$$

when parameter information is known and the lower bound is $-\infty$ and the relationship $$E(x^j) = \frac{j!}{\Gamma(\gamma)} \sum_{k=0}^{j} \frac{a^{j-k} b^{k} \beta^{-k/n} \Gamma\left(\gamma + \frac{k}{n}\right)}{k!(j-k)!}$$

when parameter information is known and the lower bound is 0, where $$\gamma = \frac{m+1}{n}$$

and $\Gamma(\gamma)$ is a standard gamma function;

obtaining a mean and a variance for the model from the statistical moment;

using the mean and the variance to perform hypotheses testing of the model; and using the results of the testing to direct further signal data generation by the sensor.

16. The method of claim 15 wherein the parameters a and b represent a known mean and standard deviation, respectively, of a class of data to which the signal data belong.

* * * * *